J. BEGBIE.
Saw-Sets.

No. 137,756. Patented April 15, 1873.

Witnesses:
C. H. Isham
H. A. Daniels

James Begbie — Inventor
Charles S. Whitman Attorney

United States Patent Office.

JAMES BEGBIE, OF PHILADELPHIA, PENNSYLVANIA.

IMPROVEMENT IN SAW-SETS.

Specification forming part of Letters Patent No. 137,756, dated April 15, 1873; application filed January 4, 1873.

*To all whom it may concern:*

Be it known that I, JAMES BEGBIE, of Philadelphia, county of Philadelphia and State of Pennsylvania, have invented an Improved Adjustable Saw-Set.

The following description, taken in connection with the accompanying plate of drawing hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

My invention relates to that class of implements which are made use of to bend each tooth of a saw a little to one side, every alternate one being bent to one side and the remainder to the other side, so that the kerf may be a little wider than the thickness of the back to prevent the latter from sticking, commonly known as saw-sets; and the nature thereof consists in certain modifications and improvements in the details of the construction of the same hereinafter described and shown.

Figure 1:
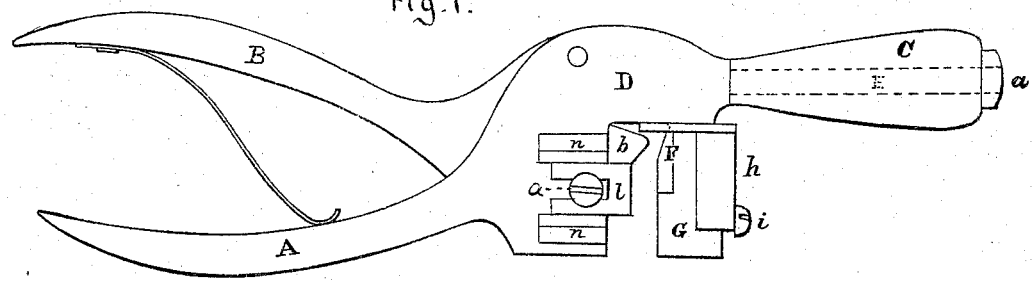
Figure 2:
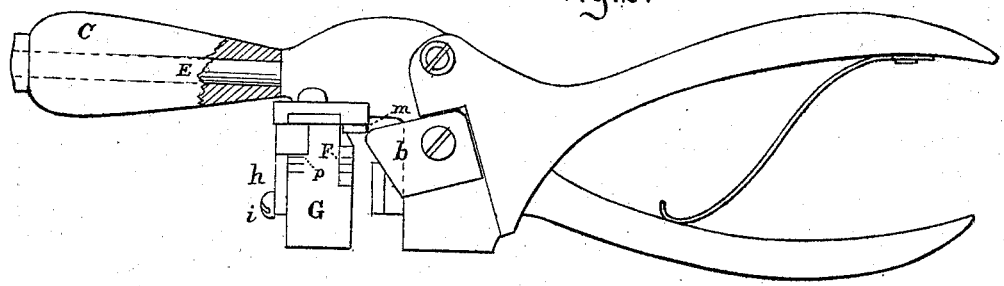
Figure 3:
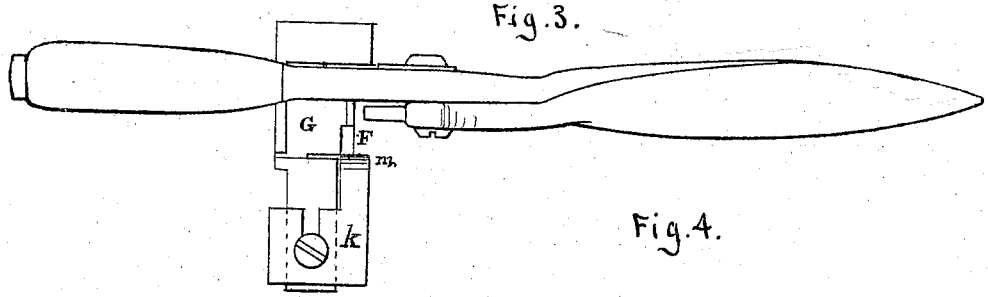
Figure 4:
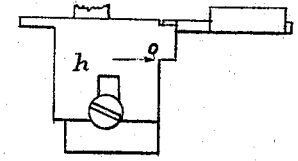

In the accompanying plate of drawing which illustrates my invention and forms a part of the specification thereof, in which corresponding parts are illustrated by similar letters, Figure 1 is a view of that side of the implement to which the shorter handle is attached. Fig. 2 is a view of that side of the implement opposite the side illustrated in Fig. 1. Fig. 3 is a top view of the implement. Fig. 4 is an end view of the setting-post.

The implement is provided with three handles, A, B, and C, two of which, A and B, are rigidly attached to the body of the implement D. The handle C is detachable—that is to say, it is provided with a cylindrical aperture, through which the rod E passes, and is secured to the said rod by the nut *a* in such a manner that it may be removed at pleasure. The said nut may also be used to secure the implement to a work-bench when the handle C is detached and the rod E fitted to a slot cut for its reception therein. The operating-handle B is pivoted to the upper part of the plate D, and is provided with a steel bit, *b*, which is secured in a slot cut for its reception in the said handle by means of a screw. The said bit, which may be made to vary in thickness according to the size of the teeth, has an inclined edge, the angle of which is such that when the handles A and B are pressed together it will coincide with and press fairly upon the beveled edge of the steel-plate F attached to the projection G, which I prefer to term the setting-stake. The said projection is provided with a gage, *h*, so arranged as to be moved upward or downward with facility and clamped in any desired position by means of the set-screw *i* for the purpose of adapting the implement to the size of the saw to be set. A smaller gage, *k*, of steel, is arranged upon the top of the gage *h* in such a manner that it may be laterally adjusted by a set-screw working in a slot cut therein, and is provided with a small hook or tooth, *m*, the office of which is to drop between the teeth of the saw and adjust the same in such a manner as to bring them exactly under the center of the steel bit *b*. The office of the gage *l* arranged to move longitudinally in grooves *n* cut in the plate, and adjusted in any desired position by means of the set-screw *a*, is to adapt the implement to the thicknesses of different saws.

The operation of my invention is as follows: The saw to be set having, for example, four to seven teeth to the inch is secured in a clamp or vise in such a manner as to allow the implement to be moved along the tops of the teeth with facility. The gage *l* is so adjusted as to allow the said saw to pass freely between the same and the projection G. The gage *h* is adjusted according to the degree of coarseness of the teeth of the saw—that is to say, if, for instance, the saw has four to seven teeth to the inch, the arrow-point *o* upon the gage is made to coincide with the upper mark *p* upon the projection, and the gage is firmly clamped in position by means of the set-screw. If the saw has eight to ten teeth to the inch the point of the arrow is made to coincide with the second mark, and for teeth still finer with the third mark. The gage *k* is so adjusted that the tooth or hook *m* catches exactly over a tooth that has been set, and thereby accurately determines the position of the tooth to the steel-bit *b*.

Having thus described the construction and operation of my invention, I will indicate in the following clauses what I claim and desire to secure by Letters Patent:

1. In combination with an implement for setting saws, the detachable handle, the rod by which the implement may be secured to the work-bench, and the nut, as and for the purposes described.

2. The combination of the setting-stake G upon which a scale is marked, the vertically-adjustable gage $h$, and the beveled steel plate F attached to the said setting-stake, all operating together as and for the purposes set forth.

3. The setting-stake G, the vertically-adjustable gage $h$, and the horizontally-adjustable transverse gage $k$ provided with a tooth or projection to fit over the points of the saw-teeth, all operating together as and for the purposes described.

4. The pivoted handle B, to which bits of different sizes may be adjusted, the body of the implement provided with a longitudinally-adjustable guide, $l$, and the stake-post G, to which is attached a beveled steel plate, all operating together, as described.

In testimony that I claim the foregoing I have hereunto set my hand and seal this 23d day of November, 1872.

JAMES BEGBIE. [L. S.]

Witnesses:
 JAS. FOWLER,
 FREDK. BREITINGER.